United States Patent [19]

Hallett et al.

[11] 4,220,184
[45] Sep. 2, 1980

[54] DELIMBER

[76] Inventors: Howard F. Hallett; Clarence W. Hallett, both of, P.O. Box 1302 Prince George, British Columbia, Canada, V2L 4V3

[21] Appl. No.: 969,300

[22] Filed: Dec. 14, 1978

[51] Int. Cl.³ ............................................. B27L 1/06
[52] U.S. Cl. ................................. 144/2.Z; 56/15.8; 56/15.9; 56/208; 144/208 J; 172/45; 172/457; 172/677; 188/311; 280/461 A; 280/478 R; 280/478 B; 280/508; 414/703
[58] Field of Search ............... 280/461 R, 461 A, 477, 280/478 R, 474, 476 R, 479 R, 508, 510, 515, 478 B; 212/59 A; 414/703, 719; 56/15.8, 15.9, 11.9, 208; 188/311; 172/45, 449, 450, 457, 680, 677, 679; 144/2 Z, 208 J

[56] References Cited

U.S. PATENT DOCUMENTS

| | | | |
|---|---|---|---|
| 2,501,925 | 3/1950 | Yensen et al. | 172/45 X |
| 2,970,851 | 2/1961 | Jones | 280/478 R |
| 3,754,603 | 8/1973 | Bogie | 172/45 |
| 4,061,166 | 12/1977 | Larson | 144/208 J |
| 4,073,507 | 2/1978 | Dingess | 280/478 B |

FOREIGN PATENT DOCUMENTS 902895  8/1962  United Kingdom ...................... 172/45

Primary Examiner—W. Donald Bray
Attorney, Agent, or Firm—Fulwider, Patton, Rieber, Lee & Utecht

[57] ABSTRACT

A delimber attachment for a tractor comprises an elongate drum mounted transversely and rotatably within a downwardly opening enclosure. The drum has a plurality of chains connected at one thereto. A frame extends forwardly from the enclosure. A hinge connector near a forward end of the frame hingedly connects the delimber to the tractor for upward and downward pivoting. A cable receiver is located near a top portion of the enclosure. A hydraulic damping cylinder is connected near a first end to the delimber and extends upwardly and forwardly therefrom. The cylinder has a clasp near a second end of the cylinder for connecting the cylinder to the tractor above the hinge connector.

14 Claims, 7 Drawing Figures

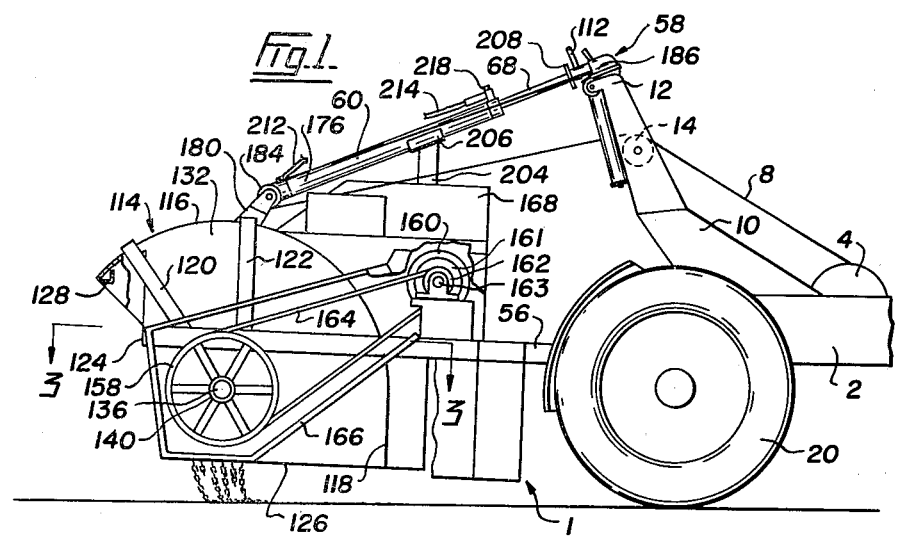
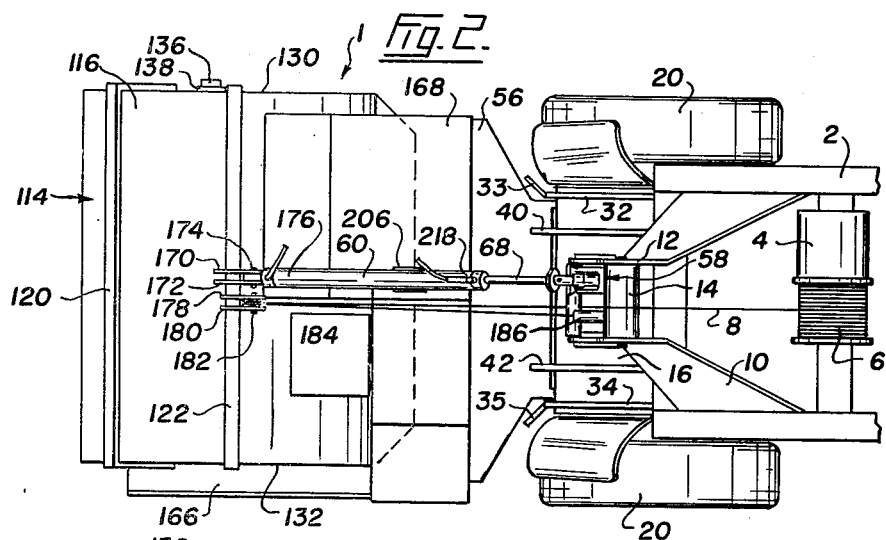
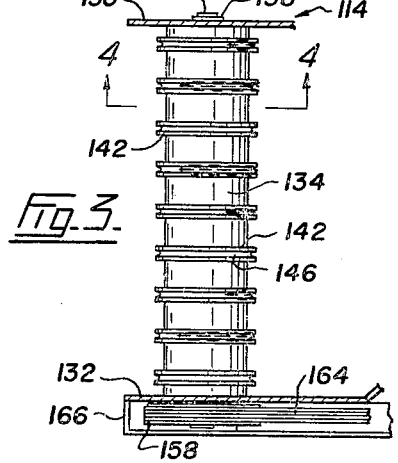
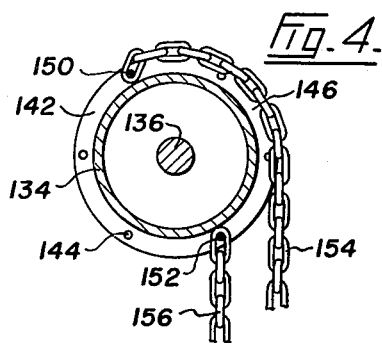

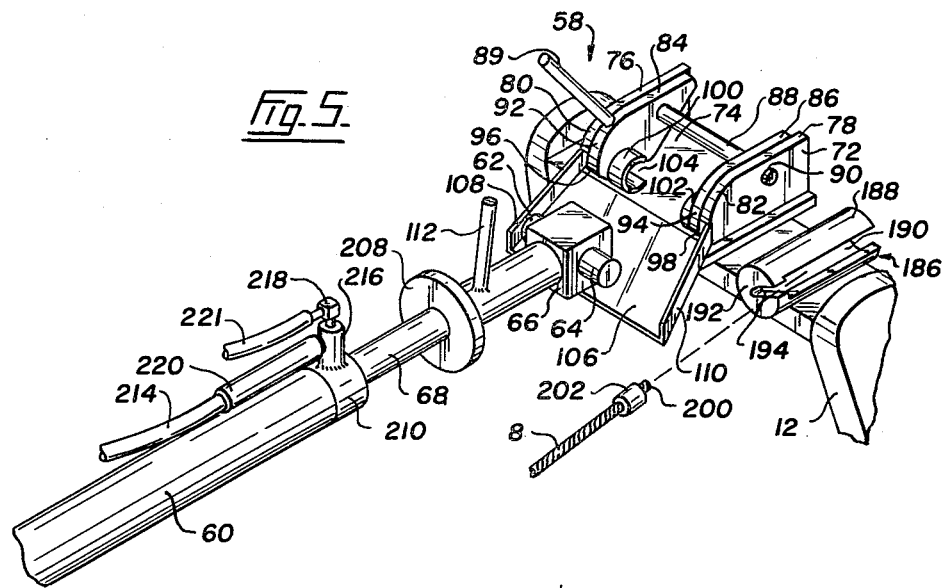
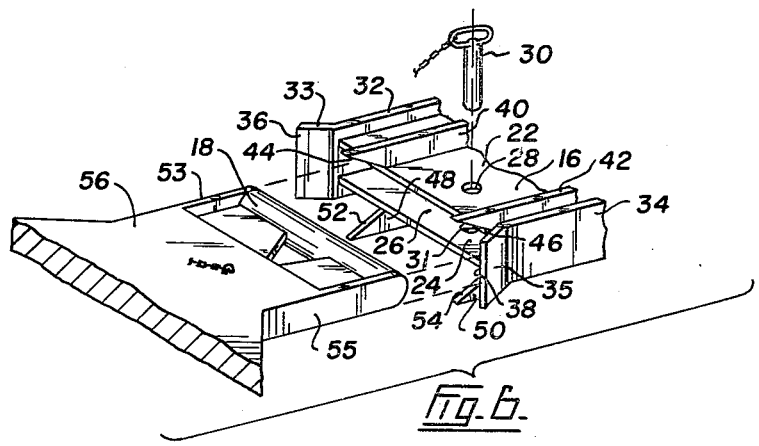
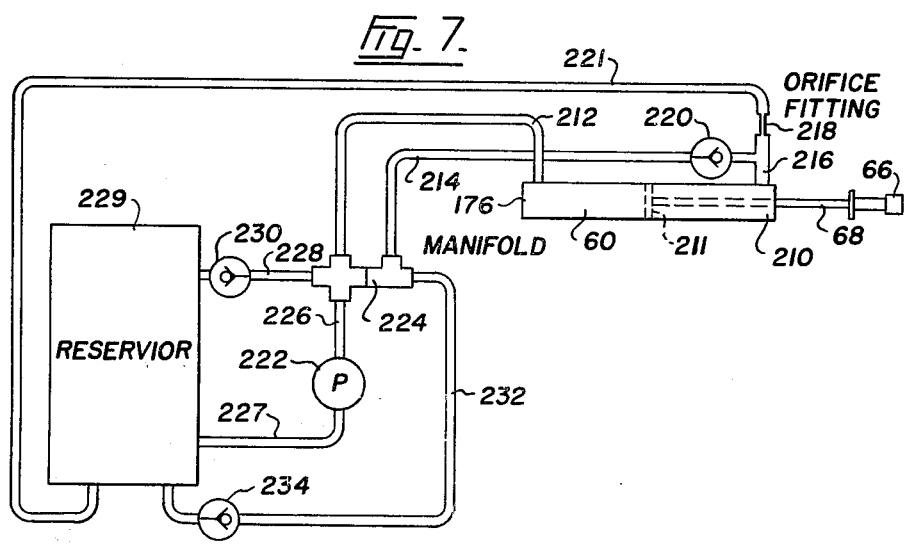

DELIMBER

BACKGROUND OF THE INVENTION

This invention relates to a delimber attachment for a tractor.

One type of delimber used for delimbing felled trees is the chain flail. Chain flails include a rotating drum and a plurality of heavy chains fastened to the drum. When the flail is passed over the felled trees, the limbs of the trees are broken off by the chains.

One type of flail presently available is designed to be carried on the front of log loading machines. This beater is picked up in the forks of the log loader and is carried over the trees or logs by the loader. It can be coupled and uncoupled quickly, but the carrier is a very expensive piece of logging equipment and is not designed to travel over logs. Consequently, maintanence is quite high and the efficiency of the logging operation is hampered.

The hydro axe is another currently available type of beater which consists of a skidder type carrier specifically designed for delimbing only. The beater is mounted on the front of the skidder and is raised and lowered by hydraulic cylinders and is connected to the carrier through a C-frame. This machine cannot be quickly uncoupled from its carrier and does not have any provision for winching or for pushing with the blade of the skidder. The hydraulic system of this machine is carried by the skidder and is specifically designed for the beater application, having no other use in the bush. This machine is comparatively expensive.

Other types of beaters on the market use various hitches to connect the delimber to the carrier or skidder by a linkage that permits the raising and lowering of the delimber employing hydraulic cylinders. However, this requires modification of the hydraulic system of the skidder and does not permit its employment in the normal skidding capacity. The beaters can be removed from the carrier, but it is a lengthly process and is usually only done when repairs are necessary. In effect, the carrier is an integral part of the beater since one cannot be used without the other. In most cases, a lug is welded to each rear fender of the skidder and an accommodating lug is welded on the beater. These lugs must be aligned by manual means and the pins are then slid into place and locked. This is usually a two man operation. One or two hydraulic cylinders are mounted between the skidder and the beater and the beater is raised and lowered by adapting the hydraulic system of the skidder. This hookup is not only time consuming, but is, in effect, permanent, in that removal and recoupling is not practical in bush operations, thereby tying up the carrier to this one function.

There have been attempts to develop successful delimbers where the delimber is raised and lowered by the use of the main line or cable of the skidder or carrier through a set of pulleys attached to the delimber and to the carrier. These worked well in raising the delimber, but it was necessary to ride the brake mechanism of the winch in order to lower the beater. This proved very difficult to control considering the weight of the beater and the speed with which it fell when released by the operator. As a result, such beaters were abandoned in favour of those using hydraulic cylinders.

The following U. S. patents may be considered relevant with respect to this invention: U.S. Pat. Nos. 2,718,410; 3,295,611; 3,260,537; 2,048,310; 1,804,973; 929,920; 2,793,880; 3,746,368; 4,023,604; 2,501,925; 3,737,385; 3,783,594; 2,674,838; 3,906,710.

SUMMARY OF THE INVENTION

The present invention provides a delimber attachment for a tractor. The attachment comprises an elongate drum mounted transversely and rotatably within a downwardly opening enclosure. The drum has a plurality of chains connected at one end thereto. A frame extends forwardly from the enclosure. A hinge connector near a forward end of the frame is for hingedly connecting the delimber to the tractor for upward and downward pivoting. Cable securing means is located near a top portion of the enclosure. A hydraulic damping cylinder is connected near a first end to the delimber and extends upwardly and forwardly therefrom. The cylinder has a clasp means near a second end of the cylinder for connecting the cylinder to the tractor above the hinge connector.

A delimber attachment according to the invention is raised about the hinge connector by the main line or cable and winch of the tractor or carrier which is connected to the cable securing means on the delimber attachment. This provides a simple and efficient means for raising the delimber where a fine degree of control is not required. However, the speed of descent of the delimber is regulated by the hydraulic damping cylinder. The winch brake on the carrier is used to control the amounts of descent only. The operator simply applies the brake of the winch to hold the delimber when it has decended to the desired level. While this mode of controlling the descent is as smooth and accurate as the hydraulic controls previously employed, it requires no expensive modification to the carrier. Consequently the delimber attachment is integral by itself and can be used efficiently by several different carriers, allowing the carriers to be quickly detached from the delimber for other work. Unlike earlier types of delimbers, the present delimber attachment can be quickly and easily attached or disconnected to the carrier or tractor. This operation can be carried out by a single operator without additional help.

In drawings which illustrate embodiments of the invention:

FIG. 1 is a side elevational view of a delimber attachment according to an embodiment of the invention and the rear portion of a skidder;

FIG. 2 is a top plan view of the delimber attachment and skidder of FIG. 1;

FIG. 3 is a top plan sectional view taken along line 3—3 of FIG. 1 and showing the delimber drum;

FIG. 4 is a side elevational sectional view taken along line 4—4 of FIG. 3 and showing the delimber drum and flailing chains thereof;

FIG. 5 is a perspective view of the clasp mechanism for connecting the hydraulic cylinder of the delimber to the skidder;

FIG. 6 is a perspective view of the hinge connector for hingedly connecting the delimber to the skidder; and FIG. 7 is a diagram of the hydraulic system of the delimber attachment.

DESCRIPTION OF THE PREFERRED EMBODIMENTS

The drawings show a delimber attachment 1 adapted for attachment to any suitable tractor or a carrier.

"Tractor" is used in the broadest sense to include the skidder 2 shown in the drawings. A skidder is a self-powered vehicle commonly used in logging operations and the skidder 2 includes a winch 4 with a reel 6 for a cable or main line 8. The skidder has an upwardly and rearwardly extending boom 10 located near the back end of the skidder. The boom 10 has a top end 12 and a guide sheave 14 for the cable 8.

The delimber attachment includes a drawbar hitch 16 for the drawbar 18 as best seen in FIG. 6. The drawbar hitch 16 is rigidly connected to the back end of the skidder 2 between the rear wheels 20 by welding. When so welded to the skidder 2, the parallel, spaced-apart flat plates 22 and 24 extend horizontally and rearwardly from the skidder 2. In this manner, a laterally extending slot 26 is formed between the plates 22 and 24 for receiving the drawbar 18. A pair of vertically aligned apertures 28 and 31 are provided on plates 22 and 24 for receiving the hitch pin 30. Apertures 28 and 31 should be positioned so that forward and rearward play of drawbar 18 is eliminated when the drawbar 18 is received within the slot 26 and pin 30 is in position.

Hitch 16 includes a pair of side guides 32 and 34 comprising flat plates welded to the skidder to each side of the slot 26 with rearward portions 33 and 35 extending rearwardly and outwardly therefrom. Portions 33 and 35 of guides 32 and 34 have guide surfaces 36 and 38 respectively for providing horizontal alignment of drawbar 18 with slot 26 when the drawbar 18 approaches the slot. The hitch 16 also includes a pair of spaced-apart upper guide members 40 and 42 comprising rectangular bars welded to the top of plate 22. Upper guide members 40 and 42 are provided with guide surfaces 44 and 46 respectively located at their rear ends and extending upwardly and rearwardly from slot 26. A corresponding pair of lower guide members 48 and 50 are welded to the bottom of plate 24 and are provided with guide surfaces 52 and 54 at their rear ends extending downwardly and rearwardly from the slot 26. The guide surfaces 44, 46 52 and 54 together provide for vertical alignment of drawbar 18 when it approaches the slot 26.

The drawbar 18 is cylindrical in shape, extends laterally and is welded between the parallel, spaced-apart bars 53 and 55 which are welded to frame 56 of the delimber attachment and project forwardly therefrom.

Referring to FIG. 5, the delimber attachment also includes a clasp 58 for hingedly connecting the damping cylinder 60 to the skidder 2. The clasp 58 holds a pair of projections 62 and 64 extending laterally from each side of the squared end 66 of piston rod 68 extending forwardly from the cylinder 60. The clasp or receiver 58 includes a mount 72 welded to the top 12 of the boom 10. The mount 72 comprises a flat horizontal plate 74 with a pair of flat, vertical and spaced-apart plates 76 and 78 welded to and extending upwardly therefrom. The upper rear corners 80 and 82 of plates 76 and 78 are rounded. A pair of flat, laterally spaced-apart securing members 84 and 86 are located inwardly from and adjacent plates 76 and 78 respectively. Securing members 84 and 86 are interconnected by shaft 88 which extends outwardly from members 84 and 86 and is rotatably received within aperture 90 of plate 78 and a corresponding identical aperture of plate 76. A handle 89 is welded to the top of member 84. The upper and rearward portions 92 and 94 of members 84 and 86 are curved the same as corners 80 and 82 of plates 76 and 78. Below portions 92 and 94, members 84 and 86 are curved rearwardly and upwardly to provide guide surfaces 96 and 98. Downwardly open, semi-tubular sections 100 and 102 are welded to and extend horizontally and inwardly from opposite semi-circular recesses 104 in members 84 and 86. Tubing sections 100 and 102 with the recesses 104 are for securing projections 62 and 64 respectively. Receiver 58 is provided with a depending guide 106 extending rearwardly and downwardly from plate 74 with upwardly extending sides 108 and 110. Handle 112, extending radially from rod 68 of cylinder 60, provides a handle for properly orienting projections 62 and 64.

Referring to FIGS. 1 and 2, the delimber attachment 1 has a downwardly opening enclosure 114 with a top 116. Frame 56 extends forwardly from the enclosure 114. Enclosure 114 is a sheet metal shell forming a semi-cylindrical section with a downwardly extending front 118 and is provided with strengthening members 120 and 122. The back 124 and the bottom 126 of the enclosure 114 are open and an angle section 128 is welded across the upper rear edge of the enclosure as shown in FIG. 1. Section 128 serves to deflect debris carried around the inside of enclosure 114. The debris deflected serves as a curtain to reduce the scattering of debris about the work area. Enclosure 114 also has parallel vertical sides 130 and 132.

An elongate drum 134, as shown in FIG. 3, is mounted transversely within enclosure 114 and is rotatable by means of axle 136 rotatable within bearings 138 and 140 of sides 130 and 132 respectively. Referring to FIGS. 3 and 4, drum 134 is provided with a plurality of circular, spaced-apart rings or flanges 142 with a plurality of horizontally extending apertures 144 spaced circumferentially thereabout. A central circular groove 146 extends inwardly from each of the flanges 142 towards drum 134, as shown in FIG. 3. Bolts 150 and 152 pass through apertures 144 of each flange 142 to secure one end of flailing chains 154 and 156 respectively within groove 146. As seen in FIG. 3, the positions of chains 154 and 156 are staggered for adjacent flanges 142 of the drum 134. This reduces vibrations during operation of the delimber attachment and also reduces surge stresses on the drive line.

A sheave 158 is fixedly mounted on the end of axle 136 by suitable means, such as a keyway, exterior to side 132 of enclosure 114 and adjacent bearing 140. Delimber attachment 1 is provided with a diesel motor 160 with a drive shaft 163 equipped with centrifugal clutch 161. Motor 160 is operatively connected to rotate drum 134 by means of sheave 158, sheave 162 mounted on shaft 163 and a drive belt 164. A guard 166 encloses and protects the drive train, the side of guide 166 being broken away in FIG. 1 to show the interior components. A housing 168 is connected to and extends from the front of enclosure 114 for hydraulic and other components mentioned below.

A pair of spaced-apart tabs 170 and 172 are welded to the top 116 of housing 114 and are provided with a pin 174 for hingedly connecting the rearward end 176 of the cylinder 60. An adjacent pair of spaced-apart tabs 178 and 180, as well as pin 182, are provided to rotatably receive sheave 184 between the tabs for securing the cable 8 of the winch 4. A cable receiver 186 is welded to the top 12 of the boom 10 adjacent clasp 58 for projections 62 and 64 on piston rod 68. Cable receiver 186 consists of a tubular body portion 188 cut away at one side to form an opening 190. Receiver 186 has a circular end 192 with a slit 194 extending inwardly from opening 190 in a generally horizontal direction. As seen in FIG. 5, the distal end 200 of the cable 8 is provided with an attachment 202 with a cross section greater than the cable. End 200 of the cable 8 can be secured to receiver 186 by passing attachment 202 through the opening 190 of the cable receiver with the cable 8 projecting rearwardly through the slot 194. As seen in FIG. 1, cable 8 extends from winch 4, over sheave 14, about sheave 184 and is secured by cable receiver 186 when the delimber attachment is operational.

Considering cylinder 60 in more detail, its first or back end 176, as mentioned above, is hingedly secured to the top 116 of enclosure 114 by pin 174. A strut 204 is welded to the top of housing 168 and is provided with a semi-tubular rest 206 welded to the top thereof which provides a lower limit for the downward pivoting of cylinder 60 about pin 174. Rod 68 of the cylinder is provided with a flat annular stop 208 adjacent handle 112 which provides an upward limit for the pivoting about drawbar 18 when second or front end 210 of cylinder 60 contacts the stop 208.

Referring to FIG. 7, cylinder 60 is provided with a first hydraulic line or conduit 212 connected to the first end 176 of the cylinder rearwardly from the piston 211, shown in FIG. 7, and a second hydraulic line 214 connected to second end 210 of the cylinder forwardly from the piston by means of a fitting 216. Connected to fitting 216 is an orifice fitting 218 located at the extreme upper and forward portion of cylinder 60. A return hydraulic line 221 is connected to orifice fitting 218. A check valve 220 is connected along hydraulic line 214 adjacent fitting 216. First and second hydraulic lines or conduits 212 and 214 are connected to hydraulic pump 222 by means of a common manifold 224 and hydraulic line 226. A pressure regulator conduit 228 connects the manifold 224 to hydraulic fluid reservoir 229. A check valve 230 is connected along conduit 228 between reservoir 229 and manifold 224. A make-up conduit 232 connects manifold 224 to reservoir 229 through check valve 234. A suction line 227 connects pump 222 to reservoir 229. Check valve 230 acts as a pressure relief valve and is set to permit flow of hydraulic fluid from manifold 224 to reservoir 229 at a pressure of 65 psi. Check valve 234 is set at 0.05 psi and restricts flow through conduit 232 to the direction from reservoir 229 to manifold 224. Check valve 220 is also set at 0.05 psi and restricts flow through conduit 214 in the direction from manifold 224 to cylinder 60.

In operation, the skidder 2 is backed up towards the drawbar 18 of the delimber attachment 1 until the drawbar comes into contact with guide surfaces 44, 46, 52, 54, 36 and 38 of the hitch 16. These guide surfaces force the drawbar downwards, upwards or sideways as is necessary so the drawbar enters the slot 26. Once the drawbar 18 is completely within the slot 26, the pin 30 is dropped through apertures 28 and 31 to maintain the drawbar within the slot. In this way, hinge movement of the delimber attachment about drawbar 18 is permitted in the upwards and downwards directions, but no horizontal movement of the bar is allowed to prevent any sway of the delimber attachment. Once pin 30 is in place, cable 8 of winch 4 is routed over sheave 14, around sheave 184, and end 200 is inserted in cable receiver 186 in the manner already described. The operator then pulls in the cable 8 with the winch 4 and this swings the delimber attachment 1 upwardly in an arc about drawbar 18. The upward swing continues until projections 62 and 64 on rod 68 approach clasp 58. The projections are guided by guide 106 and sides 108 and 110 towards members 84 and 86. When projections 62 and 64 contact the curved surfaces 96 and 98, members 84 and 86 are pivoted upwardly about axle 88 by the continued forward movement of the projections as the delimber attachment swings upwardly. Once projections 62 and 64 pass beneath tubing sections 100 and 102, members 84 and 86 drop. Projections 62 and 64 are then effectively retained within recesses 104 of members 84 and 86 and tubing sections 100 and 102.

The delimber attachment 1 can then be raised about drawbar 18 until stop 208 contacts the end 210 of the cylinder 60. This is the carrying position of the delimber attachment. When the operator wishes to lower the delimber to a working height, he throws the winch 4 into free-spool. The weight of the delimber attachment is then shifted from the cable 8 to cylinder 60 which regulates the downward motion of the delimber attachment. The fall speed is regulated by the size of the orifice in orifice fitting 218.

The hydraulic system shown in FIG. 7 has three different modes of operation: during holding of the delimber attachment in one position; when the delimber is allowed to fall and the piston rod is being extended; and when the delimber attachment is raised and the rod is being retracted. At all times, the hydraulic reservoir 229 is sealed and pressurized to prevent the entrance of contaminants from the atmosphere. The charging pump 222 provides low pressure fluid to charge cylinder 60 and bleed any air from end 210 of cylinder 60 adjacent orifice fitting 218. The manifold 224 is provided to reduce foaming and as a means of connecting all the hydraulic lines to the pump 222 and the reservoir 229.

Referring firstly to the operation of the hydraulic system when the beater is being held in one position, the characteristics are the same whether piston rod 68 is extended or retracted. Hydraulic fluid is drawn from reservoir 229 through line 227 to the pump 222. The fluid from pump 222 travels to manifold 224 where it it regulated to 65 psi by pressure relief valve 230 which permits a flow of hydraulic fluid towards reservoir 229 should the pressure of the fluid exceed 65 psi. Both ends of cylinder 60 are thus pressurized through lines 212 and 214 connected to manifold 224. Check valve 234 prevents a flow of fluid through line 232 towards the reservoir 229 from the manifold 224. Check valve 220 allows the flow of fluid through line 214 into end 210 of cylinder 60. Since return line 221 is connected to orifice fitting 218 at the highest point on cylinder 60, the hydraulic fluid fills cylinder 60 between piston 211 and end 210 and forces the air from the cylinder through the return line 221. Once the air is evacuated, fluid flows through return line 221 at all times in the hold position of the delimber attachment. However, the rate of flow is regulated by the orifice fitting 218 in the return line.

When the rod 68 is being extended as the beater is allowed to fall, fluid is forced out of end 210 of the cylinder by piston 211. This reverse flow of oil causes check valve 220 to close and all of the hydraulic fluid is forced through the orifice fitting 218 in return line 221. The size of the orifice in the orifice fitting limits the amount of flow and this in turn controls the rate of fall of the delimber attachment. At the same time, the portion of the cylinder between first end 176 and piston 211 is being enlarged and hydraulic fluid flows into this end of the cylinder through line 212. Because the downward movement of the beater is slow, the flow is relatively slow as well and the loss in pressure in the rest of the system is slight.

When the delimber attachment 1 is being raised, the rod 68 is retracted into cylinder 60 and piston 211 moves towards end 176. Since the delimber attachment 1 is usually raised quite rapidly, the hydraulic characteristics are the same whether the movement is slight or the full length of the piston rod 68. As the delimber attachment is raised, piston 211 moves away from end 210, creating a low pressure at this end of the cylinder 60. The low pressure at this end of the cylinder causes hydraulic fluid to flow from manifold 224 towards the cylinder through line 214 and check valve 220. Because of the relatively fast movement, line 214 must be large enough to permit a sufficient flow and the high flow rate causes the fluid pressure in manifold 224 to drop. When the pressure in manifold 224 drops below the pressure of reservoir 229, check valve 234 permits hydraulic fluid to flow into the manifold through line 232. Once the upward movement has stopped, check valve 234 closes and the fluid from the pump fills the cylinder between piston 211 and the end 210.

Charging pump 222 is included in the hydraulic system to ensure a positive head of hydraulic fluid in cylinder 60 between piston 211 and end 210. When the delimber attachment is raised very quickly or when the hydraulic fluid becomes cold, air is sometimes forced past the gland packing in cylinder 60. Pump 222 not only ensures that the cavity between piston 211 and end 210 is pressurized, but also provides a method of bleeding the excess air out of the cavity and into reservoir 229 as already mentioned.

When the delimber attachment is raised quickly and rod 68 is retracted at a high rate of speed, the fluid in the end of cylinder 60 between end 176 and piston 211 is pressurized and forced from the cylinder through line 212 very quickly. Although this volume of oil is more than ample to fill the cavity being created at the other end of the cylinder, a large amount of the fluid is forced through pressure relief valve 230 into the reservoir 229 due to the surge pressure of the fluid coming out.

When it is desired to free the skidder 2 for other tasks, it is simply necessary to back the delimber attachment 1 over a suitable support surface. The delimber attachment is then lowered by winch 4 until supported by the support surface. With the delimber attachment 1 fully lowered members 84 and 86 of clasp 58 can be raised by handle 89 to free projections 62 and 64 on rod 68. Pin 30 can then be pulled upwardly to release drawbar 18 and the delimber attachment is separated from the skidder 2.

We claim:

1. A delimber attachment for a tractor, the attachment having a forward end and comprising:
    an elongate drum mounted transversely and rotatably within a downwardly opening enclosure, the drum having a plurality of chains connected at one end thereto;
    a frame extending from the enclosure towards the forward end;
    a hinge connector on the frame near the forward end for hingedly connecting the delimber to the tractor and permitting upward and downward pivoting of the delimber;
    cable securing means connected to a top portion of the enclosure; and
    a hydraulic damping cylinder having a first end connected to the delimber, extending upwardly and towards the forward end of the delimber, and having means near a second end of the cylinder for connecting the cylinder to the tractor above the hinge connector.

2. A delimber attachment as claimed in claim 1, the cylinder being hingedly connected to the delimber and the means near the second end of the cylinder being hinge means for hingedly connecting the second end of the cylinder to the tractor.

3. A delimber attachment as claimed in claim 1, the delimber comprising a motor operatively connected to the drum for rotating the drum.

4. A delimber attachment as claimed in claim 3, the cylinder having an internal piston and a piston rod connected to the piston and extending axially from the cylinder, the delimber attachment including a hydraulic pump, a first conduit connecting the pump to a back end of the cylinder, a second conduit connecting the pump to a front end of the cylinder, a hydraulic fluid reservoir for containing hydraulic fluid at a reservoir pressure, a return conduit for a flow of hydraulic fluid connected to the forward end of the cylinder and to the reservoir and a restriction in the return conduit to limit the flow of hydraulic fluid therethrough.

5. A delimber attachment as claimed in claim 4, comprising a check valve in the second conduit restricting the flow of hydraulic fluid from the front of the cylinder to the reservoir to flow through the restriction.

6. A delimber attachment as claimed in claim 5, comprising a suction conduit connecting the reservoir to the pump, a pressure regulator conduit connecting the first and second conduits to the reservoir and a pressure regulator connected along the pressure regulator conduit to permit the flow of fluid towards the reservoir above a regulated pressure, a make up conduit connecting the first and second conduits to the reservoir and a make up check valve connected along the make up conduit for permitting the flow of fluid from the reservoir to the cylinder when the fluid pressure in the first and second conduits is below the reservoir pressure.

7. A delimber attachment as claimed in claim 6, the restriction comprising an orifice in the return conduit.

8. A delimber attachment as claimed in claim 7, the return conduit extending upwardly from near the forward end of the cylinder.

9. A delimber attachment as claimed in claim 1, the hinge connector comprising a laterally extending, generally cylindrical drawbar on the delimber.

10. A delimber attachment as claimed in claim 9, comprising a drawbar hitch for rigid connection to the tractor, the hitch having a laterally extending slot for receiving the drawbar and a removable, generally vertical hitch pin for extending through the hitch behind the drawbar.

11. A delimber attachment as claimed in claim 10, the hitch comprising a rearwardly and outwardly extending side guide to each side of the slot, an upwardly and rearwardly extending guide above the slot and a downwardly and rearwardly extending guide below the slot, the guides being for guiding the drawbar towards the slot.

12. A delimber attachment as claimed in claim 1, the means near the second end of the cylinder comprising projections extending laterally from each side of the cylinder near a forward end thereof and a clasp for the projections fixedly connectable to the tractor, the clasp comprising recesses for releasably securing the projections.

13. A delimber attachment as claimed in claim 12, the clasp comprising a mount fixedly connectable to the tractor and a pair of interconnected, laterally spaced-apart securing members pivotally connected to the mount for upward and downward pivoting, each securing member having a rearwardly and upwardly curving guide surface for a projection, the recesses comprising downwardly opening tubular sections extending horizontally and inwardly from each securing member.

14. In combination, the delimber attachment as claimed in claim 1 and a self-powered tractor, the tractor having an upwardly extending boom with a top end, the cylinder being connected to the tractor near the top end of the boom, the tractor having a winch and a reel of cable for the winch, the cable extending from the tractor to the cable securing means on the delimber when the delimber is operative.

* * * * *